US009693090B2

(12) United States Patent
Thissen et al.

(10) Patent No.: US 9,693,090 B2
(45) Date of Patent: Jun. 27, 2017

(54) REMOTE CONTROL FOR FIRST AND SECOND APPARATUS

(71) Applicant: Home Control Singapore Pte. Ltd., Singapore (SG)

(72) Inventors: Rogier Louis Jacques Willem Thissen, Eindhoven (NL); Teunis Den Ouden, Eindhoven (NL)

(73) Assignee: HOME CONTROL SINGAPORE PTE. LTD., Toa Payoh (SG)

( * ) Notice: Subject to any disclaimer, the term of this patent is extended or adjusted under 35 U.S.C. 154(b) by 0 days.

(21) Appl. No.: 14/785,167

(22) PCT Filed: Apr. 15, 2014

(86) PCT No.: PCT/EP2014/057643
§ 371 (c)(1),
(2) Date: Oct. 16, 2015

(87) PCT Pub. No.: WO2014/170335
PCT Pub. Date: Oct. 23, 2014

(65) Prior Publication Data
US 2016/0066015 A1    Mar. 3, 2016

(30) Foreign Application Priority Data

Apr. 16, 2013    (EP) .................................... 13163944

(51) Int. Cl.
*H04N 21/422* (2011.01)
*H04N 21/436* (2011.01)
*H04N 21/442* (2011.01)

(52) U.S. Cl.
CPC . *H04N 21/42225* (2013.01); *H04N 21/43615* (2013.01); *H04N 21/44227* (2013.01)

(58) Field of Classification Search
CPC ....... H04N 21/42225; H04N 21/43615; H04N 21/44227
See application file for complete search history.

(56) References Cited

U.S. PATENT DOCUMENTS

| 2004/0148632 | A1  | 7/2004 | Park et al. |
| 2007/0024462 | A1* | 2/2007 | Kitaura ............ H04N 21/42204 340/4.33 |

(Continued)

FOREIGN PATENT DOCUMENTS

| CA | 2909570 A1   | 10/2014 |
| CN | 105474651 A  | 4/2016  |

(Continued)

OTHER PUBLICATIONS

International Search Report for International Application No. PCT/EP2014/057643 "Remote Control for First and Second Apparatus", date of mailing: Jun. 24, 2014.

(Continued)

*Primary Examiner* — Randy Flynn
(74) *Attorney, Agent, or Firm* — Hamilton, Brook, Smith & Reynolds, P.C.

(57) ABSTRACT

First apparatuses (1) to be remotely controlled by devices (3) comprise interfaces (11) for receiving first signals from second apparatuses (2) that define that the second apparatuses (2) have received codes from the devices (3), interfaces (12) for sending second signals to the devices (3), and first controllers (21) for detecting the first signals and in response to detection results generating the second signals for providing assistance to the configurations of the devices (3) for remotely controlling the second apparatuses (2). The devices (3) for remotely controlling the first apparatuses (1) comprise interfaces (14) for sending codes to the second apparatuses (2) for remotely controlling the second apparatuses (2), interfaces (15) for receiving the second signals from the (Continued)

first apparatuses (1), and second controllers (22) for detecting the second signals for configuring the devices (3) for remotely controlling the second apparatuses (2).

15 Claims, 2 Drawing Sheets

(56) References Cited

U.S. PATENT DOCUMENTS

| | | | |
|---|---|---|---|
| 2007/0052547 A1* | 3/2007 | Haughawout | H04N 5/445 340/4.31 |
| 2009/0051824 A1* | 2/2009 | Satou | H04N 21/4221 348/734 |
| 2009/0207319 A1 | 8/2009 | Satoh et al. | |
| 2010/0079682 A1* | 4/2010 | Martch | H04N 21/42207 348/734 |
| 2010/0146579 A1* | 6/2010 | Reams | H04N 21/4104 725/131 |
| 2011/0050478 A1 | 3/2011 | Choi et al. | |
| 2011/0114716 A1* | 5/2011 | Pratt | H04N 21/42204 235/375 |
| 2012/0075538 A1* | 3/2012 | Okuda | H04N 21/43615 348/734 |
| 2012/0117179 A1* | 5/2012 | Agnihotri | H04N 21/43632 709/208 |
| 2012/0140124 A1* | 6/2012 | Moroney | H04N 21/42207 348/734 |
| 2013/0005250 A1* | 1/2013 | Kim | H04N 21/4126 455/41.1 |
| 2014/0218620 A1* | 8/2014 | Griffin | H04N 21/41407 348/734 |

FOREIGN PATENT DOCUMENTS

| | | |
|---|---|---|
| EP | 2 424 268 A1 | 2/2012 |
| EP | 2 472 894 A1 | 7/2012 |
| EP | 2987333 A1 | 2/2016 |
| JP | 2016521498 A | 7/2016 |
| WO | WO 2014/170335 A1 | 10/2014 |

OTHER PUBLICATIONS

Written Opinion of the International Searching Authority for International Application No. PCT/EP2014/057643 "Remote Control for First and Second Apparatus", date of mailing: Jun. 24, 2014.

International Preliminary Report on Patentability for Int'l Application No. PCT/EP2014/057643, "Remote Control for First and Second Apparatus," date issued Oct. 20, 2015.

European Patent Register: Amendments and Letter accompanying subsequently filed items of Jul. 27, 2016, in response to Examination Report of Jan. 27, 2016 for EP2987333, "Remote Control for First and Second Apparatus".

* cited by examiner

REMOTE CONTROL FOR FIRST AND SECOND APPARATUS

This application is the U.S. National Stage of International Application No. PCT/EP2014/057643, filed Apr. 15, 2014, which designates the U.S., published in English, and claims priority under 35 U.S.C. §§119 or 365(c) to European Application No. 13163944.5, filed Apr. 16, 2013.

FIELD OF THE INVENTION

The invention relates to a first apparatus arranged to be remotely controlled by a device. The invention further relates to a device, and to a system.

Examples of such a first apparatus are a set-top-box, a television, a video player, a video player/recorder, an audio player and/or an audio player/recorder. Examples of such a device are a remote control, a portable phone, a portable computer, a portable video player, a portable video player/recorder, a portable audio player and/or a portable audio player/recorder.

BACKGROUND OF THE INVENTION

EP 2 472 894 A1 discloses a remote control device. This remote control device is a programmable remote control device. To program the remote control device, a user is involved relatively much.

US 2004/0148632 A1 discloses a remote controller and set-top-box therefor.

SUMMARY OF THE INVENTION

It is an object of the invention to provide an improved first apparatus. Further objects of the invention are to provide an improved device, and to provide a system.

According to a first aspect, a first apparatus arranged to be remotely controlled by a device is provided, the first apparatus comprising
  a first interface for receiving a first signal from a second apparatus, the first signal defining the second apparatus having received a code from the device,
  a second interface for sending a second signal to the device, the second signal informing the device of the second apparatus having received the code, and
  a first controller for detecting the first signal and in response to a detection result generating the second signal, the detection result indicating that the second apparatus has understood or has not understood the code.

A first apparatus can be remotely controlled via a device. The device knows the first apparatus, but does not know a second apparatus. A first interface makes a first communication from the second apparatus to the first apparatus possible. A second interface makes a second communication from the first apparatus to the device possible. A first controller may provide assistance to a configuration of the device for remotely controlling the second apparatus by detecting the first signal and in response to a detection result generating the second signal. The first signal may define that the second apparatus has received a code from the device. The code may for example be, for a second apparatus in the form of a television, volume up, volume down, channel up, channel down etc. and may for example be, for a second apparatus in the form of a video player, play, fast forward, fast backward, freeze etc. The detection result may indicate that the second apparatus has understood or has not understood the code as sent by the device to the second apparatus. The second signal may further define what code has been received. As a result, the device can be configured and/or programmed to remotely control the second apparatus, without a user being involved relatively much. This is a great improvement.

An embodiment of the first apparatus is defined by the first controller being arranged to start a detection of the first signal on its own initiative or to start a detection of the first signal in response to a reception of a third signal sent by the device. The first apparatus plays a key role in the configuration of the device, owing to the fact that the first apparatus can communicate with the device as well as with the second apparatus. The first apparatus may start (waiting for) a detection of the first signal on its own initiative, or the first apparatus may start (waiting for) a detection of the first signal in response to a command from the device in the form of a third signal sent from the device to the first apparatus. The third signal may be sent from the device to the first apparatus directly or may be sent indirectly via the second apparatus. The first apparatus could for example start a detection of the first signal on its own initiative and then inform the device, or the first apparatus could for example start a detection of the first signal in response to the device having started such a configuration. In the latter case, the device may have informed the first apparatus via the third signal.

An embodiment of the first apparatus is defined by the first controller detecting the first signal and in response to the detection result generating the second signal for providing assistance to a configuration of the device for remotely controlling the second apparatus.

An embodiment of the first apparatus is defined by further comprising
  a first memory for storing codes, the second interface being arranged to send the codes to the device, which codes are destined to be used by the device for said remotely controlling the second apparatus. The first apparatus may provide the codes for controlling the second apparatus to the device.

An embodiment of the first apparatus is defined by the first interface being arranged to receive the codes from the second apparatus, or the first apparatus being arranged to download the codes. The first apparatus may receive the codes from the second apparatus or may download these codes in response to being informed about a definition of the second apparatus.

An embodiment of the first apparatus is defined by further comprising
  a third interface for receiving a fourth signal from the device for said remotely controlling of the first apparatus by the device. The device can control the first apparatus via a fourth signal to be received by the first apparatus via a third interface. The fourth signal may be a code or another signal and the third interface may be identical to or different from the second interface.

According to a second aspect, a device is provided for remotely controlling a first apparatus, the device comprising
  a fourth interface for sending a code to a second apparatus for remotely controlling the second apparatus, the first apparatus being arranged to receive a first signal from the second apparatus, the first signal defining the second apparatus having received the code,
  a fifth interface for receiving a second signal from the first apparatus, and
  a second controller for detecting the second signal for configuring the device for remotely controlling the second apparatus, the second signal informing the device of the second apparatus having received the code from the device, the first apparatus being arranged to detect the first signal and in response to a detection result generate the second signal, the detection result indicating that the second apparatus has understood or has not understood the code.

An embodiment of the device is defined by the second controller being arranged to start a configuration on its own initiative or to start a configuration in response to a reception of a trigger signal sent by the first apparatus. This trigger signal may for example be exchanged via the fifth interface.

An embodiment of the device is defined by further comprising a second memory for storing codes, which codes are destined to be used by the device for said remotely controlling the second apparatus.

An embodiment of the device is defined by the fifth interface being arranged for receiving the codes from the first apparatus, or the device being arranged to download the codes. The device may receive the codes for remotely controlling the second apparatus from the first apparatus or may download these codes.

An embodiment of the device is defined by further comprising a sixth interface for sending a fourth signal to the first apparatus for said remotely controlling of the first apparatus by the device. The fourth signal may be a code or another signal and the sixth interface may be identical to or different from the fourth interface and may be identical to or different from the fifth interface.

According to a third aspect, a system is provided comprising the first apparatus as defined above and the device as defined above, the first and second apparatuses each comprising an appliance for mainly providing information to a user, either directly via itself, or indirectly via another appliance, and the first and second apparatuses being no gateways that mainly interface different appliances.

An embodiment of the system is defined by the first apparatus comprising at least one from a first list comprising a set-top-box, a television, a computer, a video player, a video player/recorder, an audio player and/or an audio player/recorder, and the device comprising at least one from a second list comprising a remote control, a phone, a computer, a video player, a video player/recorder, an audio player and/or an audio player/recorder. The second apparatus may usually comprise another one from the first list.

An embodiment of the system is defined by the second and fifth interfaces operating according to a wireless standard, the first interface operating according to a wired or wireless standard, and the fourth interface operating according to a wireless standard.

An embodiment of the system is defined by the second and fifth interfaces operating according to a radio-frequency-for-consumer-electronics standard, the first interface operating according to a high-definition-multimedia-interface-standard or a digital-living-network-alliance-standard or a universal-plug-and-play-standard, and the fourth interface operating according to an infrared standard.

An insight is that an involvement of a user during a configuration of a device for remotely controlling a second apparatus is to be reduced. A basic idea is that a first apparatus should play an interfacing role between the device and the second apparatus.

A problem to provide an improved first apparatus and an improved device has been solved. A further advantage is that, to program the device, a user is involved relatively little.

These and other aspects of the invention will be apparent from and elucidated with reference to the embodiments described hereinafter.

DETAILED DESCRIPTION OF EMBODIMENTS

Figure 1:
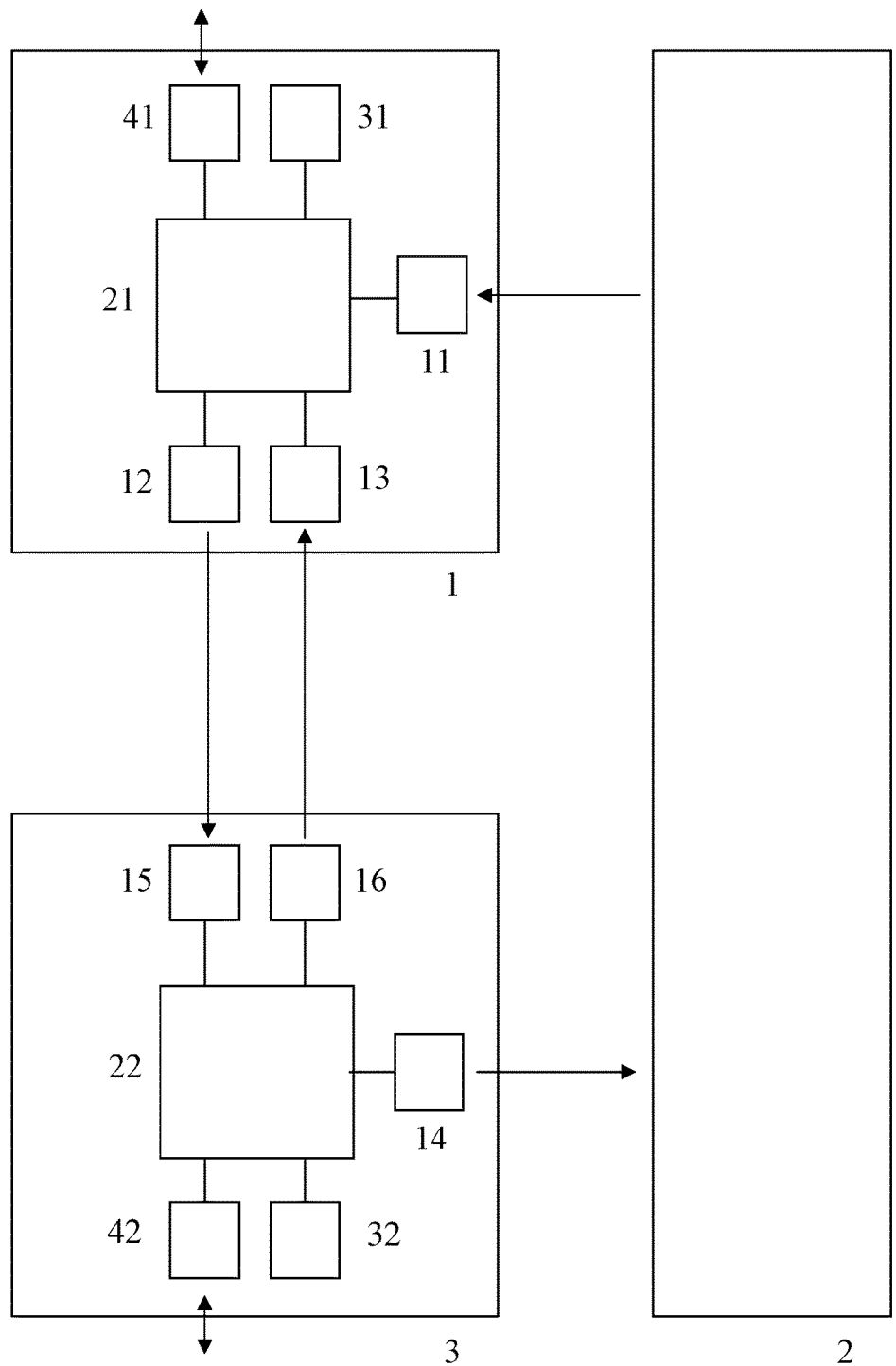
FIG. 1 shows embodiments of a first apparatus and of a device.

In the FIG. 1, an embodiment of a first apparatus 1 and an embodiment of a device 3 are shown. The first apparatus 1, such as a set-top-box, a television, a computer, a video player, a video player/recorder, an audio player and/or an audio player/recorder, comprises a first interface 11 for receiving a first signal from a second apparatus 2, such as a set-top-box, a television, a computer, a video player, a video player/recorder, an audio player and/or an audio player/recorder. The first apparatus 1 further comprises a second interface 12 for sending a second signal to the device 3, such as a remote control, a phone, a computer, a video player, a video player/recorder, an audio player and/or an audio player/recorder, and a first controller 21 for detecting the first signal and in response to a detection result generating the second signal for providing assistance to a configuration of the device 3 for remotely controlling the second apparatus 2. Preferably, the first controller 21, to provide the assistance, is arranged to start a detection on its own initiative or to start a detection in response to a reception of a third signal sent by the device 3. The first signal defines for example that the second apparatus 2 has received a code from the device 3. The second signal for example informs the device 3 of the reception.

The device 3 can remotely control the first apparatus 1 and is configured and/or programmed via a cooperation with the first apparatus 1 to remotely control the second apparatus 2. Thereto, the device 3 comprises a fourth interface 14 for sending a code to a second apparatus 2 for remotely controlling the second apparatus 2, a fifth interface 15 for receiving the second signal from the first apparatus 1, and a second controller 22 for detecting the second signal for configuring the device 3 for remotely controlling the second apparatus 2, the second signal informing the device 3 of the second apparatus 2 having received the code from the device 3. The first, second and third signals have been described above.

Preferably, the first apparatus 1 may further comprise a first memory 31 for storing codes designed for letting the device 3 remotely control the second apparatus 2. The second interface 12 may be arranged to send the codes to the device 3. The first interface 11 may be arranged to receive these codes from the second apparatus 2, or the first apparatus 1 may be arranged to download the codes, for example via an internet interface 41. The first apparatus 1 may further comprise a third interface 13 for receiving a fourth signal from the device 3 for said remotely controlling of the first apparatus 1 by the device 3.

Preferably, the device 3 may further comprise a second memory 32 for storing the codes designed for letting the device 3 remotely control the second apparatus 2. The fifth interface 15 may be arranged for receiving the codes from the first apparatus 1, or the device 3 may be arranged to download the codes, for example via an internet interface 42. The device 3 may further comprise a sixth interface 16 for sending a fourth signal to the first apparatus 1 for said remotely controlling of the first apparatus 1 by the device 3.

The interfaces 12 and 13 may be one and the same interface, or not. The interfaces 14 and 16 may be one and the same interface, or not. The interfaces 15 and 16 may be one and the same interface, or not. The interfaces 12-16 operate usually according to a wireless standard, the interface 11 usually operates according to a wired standard but may alternatively operate according to a wireless standard. The interfaces 12 and 15 may operate according to a radio-frequency-for-consumer-electronics standard. The interface 11 may operate according to a high-definition-multimedia-interface-standard or a digital-living-network-alliance-standard or a universal-plug-and-play-standard, and the interfaces 13, 14 and 16 may operate according to an infrared standard. A code may be an infrared code, without having excluded radio frequency codes, and the fourth signal may be a radio frequency signal, without having excluded infrared signals. In fact, any signal may be any kind of signal as used for wired or wireless communication. The wired and wireless interfaces may further operate according to an Internet Protocol etc. Each wired link and each wireless link may be a unidirectional link or a bidirectional link. A wired Ethernet, a wireless Wi-Fi and the Internet Protocol are not to be excluded etc.

Figure 2:
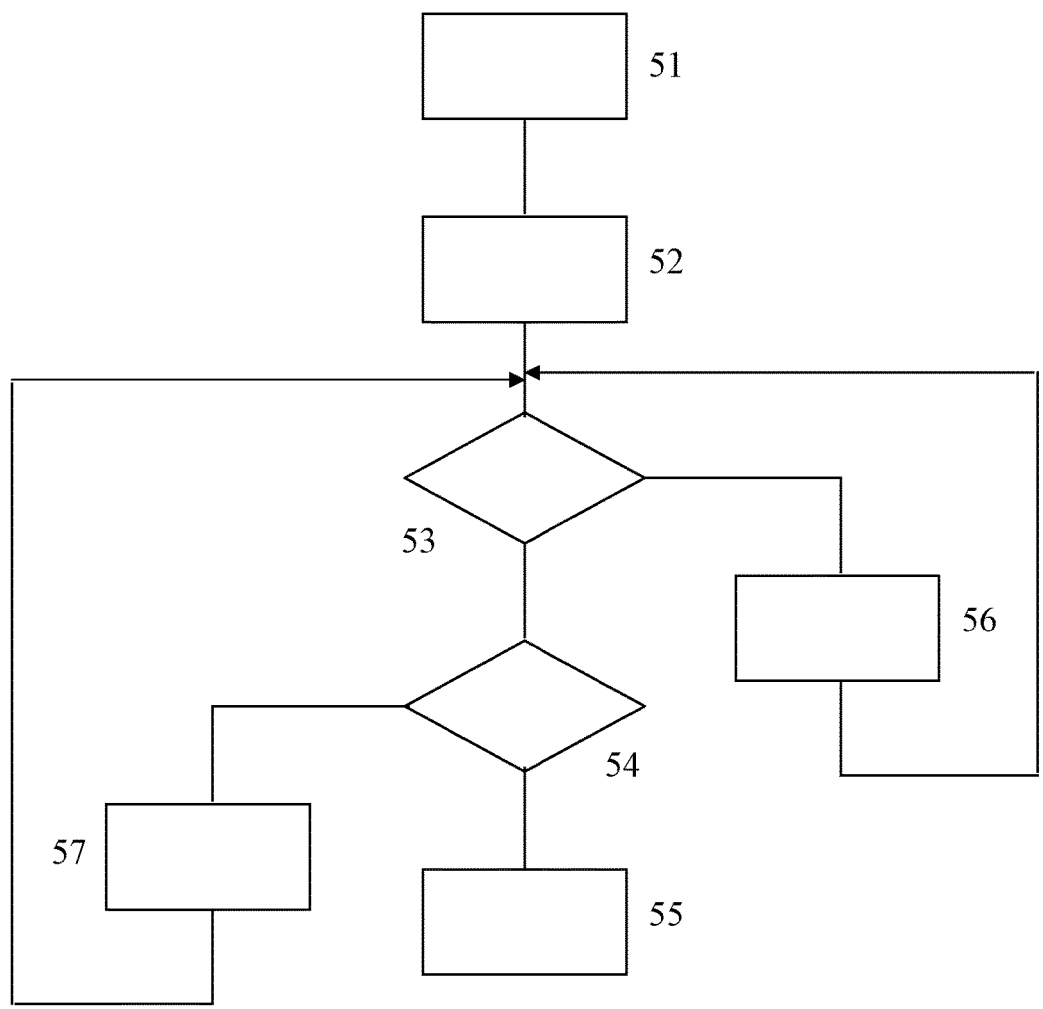
FIG. 2 shows a flow chart.

In the FIG. 2, a flow chart is shown, wherein the following blocks have the following meaning:

Block 51: A start of a configuration of a device 3, initiated by a first apparatus 1. The first apparatus 1 has identified a second apparatus 2, via its brand, trademark, type etc. as for example determined via an information signal such as a high-definition-multimedia-interface-standard signal received via the first interface 11. Go to block 52.

Block 52: The first apparatus 1 sends a trigger signal to the device 3 for example via the second and fifth interfaces 12 and 15 and thereby informs the device 3 about the identity of the second apparatus 2 and for example starts a time-interval. Go to block 53.

Block 53: The first apparatus 1 monitors first signals arriving via the first interface 11. If a relevant first signal has arrived within the time-interval, go to block 54, otherwise go to block 56.

Block 54: The first apparatus 1 detects the relevant first signal. If the relevant first signal shows that the second apparatus 2 has understood a code as sent by the device 3 to the apparatus 2, go to block 55, otherwise go to block 57.

Block 55: An end of the configuration. The first apparatus 1 informs the device 3 via a second signal that the device 3 has used a proper code.

Block 56: The first apparatus 1 informs the device 3 via a second signal that another code is to be tried and starts a time-interval. Go to block 53.

Block 57: The first apparatus 1 sends a second signal to the device 3 to inform the device 3 that another code is to be tried and starts a time-interval. Go to block 53.

A start of a configuration of a device 3 is initiated by a first apparatus 1. The first apparatus 1 has identified a second apparatus 2, via its brand, trademark, type etc. as for example determined via an information signal such as a high-definition-multimedia-interface-standard signal received via the first interface 11 (block 51). Alternatively, the first apparatus 1 may only have detected a presence of a second apparatus 2 for example via the first interface 11. The first apparatus 1 sends a trigger signal to the device 3 for example via the second and fifth interfaces 12 and 15 and thereby informs the device 3 about the identity or the presence of the second apparatus 2 and thereby instructs the device 3 to send a code to the second apparatus 2 and starts a time-interval (block 52). Alternatively, said time-interval is started in response to a confirmation arrived via the second/third interface 12/13 from the device 3. The first apparatus 1 monitors first signals arriving via the first interface 11 (block 53). Irrelevant first signals are to be ignored, such as for example first signals that are not produced in response to remote control actions. If a relevant first signal has arrived within the time-interval, the first apparatus 1 detects the relevant first signal (block 54). If the relevant first signal shows that the second apparatus 2 has understood the code as sent by the device 3 to the apparatus 2, this may be an end of the configuration (block 55), and the first apparatus 1 may inform the device 3 via a second signal that the device 3 has used a proper code. The device 3 now knows what codes are to be used for remotely controlling the second apparatus 2. Alternatively, more codes may be tried, before an end of the configuration has been reached. Otherwise, if not understood (blocks 56 and 57), the first apparatus 1 may send a second signal to the device 3 to inform the device 3 that another code is to be tried and may start the time-interval again etc. Further, it is possible that during the time-interval no first signal will arrive and that the first apparatus 1 is arranged, after the time-interval has elapsed, to respond to that etc. The end of the configuration (block 55) may also be reached in case no code has worked.

Alternatively, a start of a configuration of a device 3 may be initiated by the device 3. In that case, the device 3 may inform the first apparatus 1 via a third signal about the start, or not, for example in response to a user input, and sends a code to the second apparatus 2. The first apparatus 1 monitors and detects the first signals arriving via the first interface 11 and informs the device 3 via the second signals. The device 3 may decide to stop the configuration in case it has become clear that the second apparatus 2 has understood the code as sent to it by the device 3. Alternatively, more codes may be tried, before an end of the configuration has been reached. Otherwise, if not understood, the device 3 may send a next code to the second apparatus 2 and wait for the second signal from the first apparatus 1 that may indicate that the second apparatus 2 has understood this next code or not etc. Said waiting may be managed by monitoring a time-interval etc. And again, it is possible that during the time-interval the device 3 does not receive a second signal and that the device 3 is arranged, after the time-interval has elapsed, to respond to that etc. The end of the configuration may also be reached in case no code has worked.

The code may comprise any code for remotely controlling the second apparatus 2, as long as the first signal is generated in response to a reception of the code and can be detected via the first interface 11. The code may for example comprise for a second apparatus 2 in the form of a television, volume up, volume down, channel up, channel down etc. and for a second apparatus 2 in the form of a video player, play, fast forward, fast backward, freeze etc.

The first and second apparatuses 1 and 2 each comprise an appliance for mainly providing information to a user, either directly via itself, or indirectly via another appliance. The first and second apparatuses 1 and 2 are no gateways that mainly interface different appliances.

The first apparatus 1 and/or the device 3 may further comprise a monitor for monitoring the time-interval or another time-interval. So, the first apparatus 1 and the device 3 may be on the same decision level, or each one of them may be on a higher decision level than the other one. In that case, each one of them may be the master or the slave.

The monitoring of time-intervals as described above is an example only, alternatively said monitoring may not be necessary, for example in case said first signals are produced regularly, each one defining that a code has been received or not but each one being produced independently from whether a code has been received or not.

Summarizing, first apparatuses 1 to be remotely controlled by devices 3 comprise interfaces 11 for receiving first signals from second apparatuses 2 that define that the second apparatuses 2 have received codes from the devices 3, interfaces 12 for sending second signals to the devices 3, and first controllers 21 for detecting the first signals and in response to detection results generating the second signals for providing assistance to the configurations of the devices 3 for remotely controlling the second apparatuses 2. The devices 3 for remotely controlling the first apparatuses 1 comprise interfaces 14 for sending codes to the second apparatuses 2 for remotely controlling the second apparatuses 2, interfaces 15 for receiving the second signals from the first apparatuses 1, and second controllers 22 for detecting the second signals for configuring the devices 3 for remotely controlling the second apparatuses 2.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A first apparatus arranged to be remotely controlled by a device, the first apparatus comprising:
   a first interface for receiving a first signal from a second apparatus, the first signal defining the second apparatus as having received an improper code from the device,
   a first controller for detecting the first signal including a detection result, and in response to the detection result generating a second signal, the detection result indicating the second apparatus failed to understand the improper code, and
   a second interface for sending the second signal to the device, the second signal informing the device of the second apparatus: (i) having received the improper code, (ii) failing to understand the improper code, and (iii) requesting the device to transmit a different but proper code to the second apparatus within a given time-interval.

2. The first apparatus as defined in claim 1, the first controller being arranged to start a detection of the first signal on its own initiative or to start a detection of the first signal in response to a reception of a third signal sent by the device.

3. The first apparatus as defined in claim 1, the first controller detecting the first signal and in response to the detection result generating the second signal, wherein the second signal results in a configuration of the device for remotely controlling the second apparatus.

4. The first apparatus as defined in claim 1, further comprising
   a first memory for storing codes, the second interface being arranged to send the codes to the device, which codes are destined to be used by the device remotely controlling the second apparatus.

5. The first apparatus as defined in claim 4, the first interface being arranged to receive the codes from the second apparatus, or the first apparatus being arranged to download the codes.

6. The first apparatus as defined in claim 1, further comprising
   a third interface for receiving a fourth signal from the device remotely controlling of the first apparatus by the device.

7. A device configured to remotely control a first apparatus receiving a first signal from a second apparatus, the device comprising:
   a fourth interface configured to send a code to the second apparatus, the code being an improper code for remotely controlling the second apparatus,
   a fifth interface configured to receive a second signal from the first apparatus, and
   a second controller configured to detect the second signal for configuring the device to remotely control the second apparatus, the second signal informing the device of the second apparatus having received the improper code from the device, the first apparatus detecting the first signal including a detection result, and in response to the detection result generating the second signal, the second signal defining the second apparatus as: (i) having received the improper code, (ii) failing to understand the improper code, and (iii) requesting the device to transmit a different but proper code to the second apparatus within a given time-interval.

8. The device as defined in claim 7, the second controller being arranged to start a configuration on its own initiative or to start a configuration in response to a reception of a trigger signal sent by the first apparatus.

9. The device as defined in claim 7, further comprising
   a second memory for storing codes, which codes are destined to be used by the device remotely controlling the second apparatus.

10. The device as defined in claim 9, the fifth interface being arranged for receiving the codes from the first apparatus, or the device being arranged to download the codes.

11. The device as defined in claim 7, further comprising
    a sixth interface for sending a fourth signal to the first apparatus remotely controlling of the first apparatus by the device.

12. A system comprising:
    a first apparatus;
    a second apparatus; and
    a device remotely controlling the first and second apparatuses, the first and second apparatuses each comprising an appliance for providing information to a user, either directly via itself, or indirectly via another appliance, the first apparatus comprising:
    a first interface for receiving a first signal from the second apparatus, the first signal defining the second apparatus as having received an improper code from the device,
    a first controller for detecting the first signal including a detection result, and in response to the detection result generating a second signal, the detection result indicating the second apparatus failed to understand the improper code, and a second interface for sending the second signal to the device, the second signal informing the device of the second apparatus: (i) having received the improper code, (ii) failing to understand the improper code, and (iii) requesting the device to transmit a different but proper code to the second apparatus within a given time-interval; and the device comprising:

a fourth interface configured to send a code to the second apparatus, the code being the improper code for remotely controlling the second apparatus, a fifth interface configured to receive the second signal from the first apparatus, and a second controller configured to detect the second signal for configuring the device to remotely control the second apparatus, the second signal informing the device of the second apparatus having received the improper code from the device, the first apparatus detecting the first signal including the detection result, and in response to the detection result generating the second signal, the second signal defining the second apparatus as: (i) having received the improper code, (ii) failing to understand the improper code, and (iii) requesting the device to transmit the different but proper code to the second apparatus within the given time-interval.

13. The system as defined in claim 12, the first apparatus comprising at least one from a first list comprising a set-top-box, a television, a computer, a video player, a video player/recorder, an audio player and/or an audio player/recorder, and the device comprising at least one from a second list comprising a remote control, a phone, a computer, a video player, a video player/recorder, an audio player and/or an audio player/recorder.

14. The system as defined in claim 12, the second interface and the fifth interface operating according to a wireless standard, the first interface operating according to a wired or wireless standard, and the fourth interface operating according to a wireless standard.

15. The system as defined in claim 12, the second interface and the fifth interface operating according to a radio-frequency-for-consumer-electronics standard, the first interface operating according to a high-definition-multimedia-interface-standard or a digital-living-network-alliance-standard or a universal-plug-and-play-standard, and the fourth interface operating according to an infrared standard.

* * * * *